United States Patent
Funaki et al.

(10) Patent No.: US 7,662,454 B2
(45) Date of Patent: *Feb. 16, 2010

(54) LAMINATE HOSE MADE OF FLUOROCOPOLYMER

(75) Inventors: Atsushi Funaki, Ichihara (JP); Toshiyuki Chisaka, Ichihara (JP); Hiroki Kamiya, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 11/391,311

(22) Filed: Mar. 29, 2006

(65) Prior Publication Data

US 2006/0233992 A1 Oct. 19, 2006

(30) Foreign Application Priority Data

Apr. 19, 2005 (JP) .............................. 2005-121325

(51) Int. Cl.
*B32B 1/06* (2006.01)
*B32B 27/06* (2006.01)
*B32B 27/18* (2006.01)
*B32B 27/30* (2006.01)

(52) U.S. Cl. .................. 428/36.91; 428/35.7; 428/36.9; 428/421; 428/475.8

(58) Field of Classification Search ................ 428/35.7, 428/36.9, 36.91, 421, 475.8
See application file for complete search history.

(56) References Cited

U.S. PATENT DOCUMENTS

| | | | |
|---|---|---|---|
| 6,855,787 B2 | 2/2005 | Funaki et al. | |
| 7,019,079 B2 | 3/2006 | Sumi et al. | |
| 7,112,640 B2 * | 9/2006 | Funaki et al. | 526/249 |
| 2007/0056681 A1 * | 3/2007 | Aida et al. | 156/244.11 |

FOREIGN PATENT DOCUMENTS

| | | |
|---|---|---|
| EP | 0 911 347 A2 | 4/1999 |
| EP | 1 338 612 A1 | 8/2003 |
| EP | 1 470 910 A1 | 10/2004 |
| EP | 1 652 865 A1 | 5/2006 |
| WO | 2005068191 * | 7/2005 |

OTHER PUBLICATIONS

U.S. Appl. No. 11/224,969, filed Sep. 14, 2005, Funaki, et al.
Takao Ogawa, et al., "Determination and Structure Elucidation of Comonomers in Fluorinated Copolymers by Molten-State $^{19}$F-NMR", Reports of the Research Laboratory, Asahi Glass Co., Ltd., 40(1), 1990, pp. 75-82.

* cited by examiner

*Primary Examiner*—Ana L Woodward
(74) *Attorney, Agent, or Firm*—Oblon, Spivak, McClelland, Maier & Neustadt, L.L.P.

(57) ABSTRACT

A laminate hose comprising a laminate of a fluorocopolymer and a polyamide, wherein the fluorocopolymer comprises repeating units (a) based on tetrafluoroethylene and/or chlorotrifluoroethylene, repeating units (b) based on a cyclic hydrocarbon monomer having a dicarboxylic anhydride group and having a polymerizable unsaturated group in the ring, and repeating units (c) based on another fluoromonomer (excluding tetrfluoroethylene and chlorofluoroethylene) with contents of the repeating units (a) of from 50 to 99.89 mol %, the repeating units (b) of from 0.01 to 5 mol % and the repeating units (c) of from 0.1 to 49.99 mol % based on the total number of mols of the repeating units (a), (b) and (c), and has a flow coefficient of from 0.1 to 1,000 mm$^3$/sec.

18 Claims, No Drawings

LAMINATE HOSE MADE OF FLUOROCOPOLYMER

The present invention relates to a laminate hose made of a fluorocopolymer. More particularly, it relates to a laminate hose comprising a laminate of a fluorocopolymer excellent in interlaminar adhesion and fuel barrier properties with a polyamide.

Fluorocopolymers (hereinafter sometimes referred to as fluororesins) such as a polytetrafluoroethylene, a tetrafluoroethylene/perfluoro (alkyl vinyl ether) copolymer and an ethylene/tetrafluoroethylene copolymer are excellent in chemical resistance, heat resistance, weather resistance and gas barrier properties and are used in various fields such as semiconductor industry and aircraft and automobile industry.

In recent years, from an environmental viewpoint, the regulation of total emission of fuel which leaks out from automobiles by vaporization and permeation is increasingly strict in advanced countries such as North America, European countries and Japan. Accordingly, it has been required to considerably decrease permeation of fuel particularly from a fuel hose among members to be used for automobiles.

A fluororesin basically has low fuel permeability and is thereby suitable as a material for a fuel hose which conforms to the above regulation. However, a fluororesin is expensive and its mechanical characteristics are not necessarily satisfactory. Thus, it is laminated with e.g. a polyamide for the purpose of achieving a low cost and improvement in mechanical characteristics.

In general, a fluororesin has noncohesive properties and is poor in adhesive properties to another material. Accordingly, various methods have been studied to improve adhesive properties of a fluororesin to a polyamide e.g. for production of a fuel hose (hereinafter sometimes referred to as a fuel tube). For example, as a method of improving adhesive properties, a method of treating the surface of a fluororesin e.g. by a chemical treatment, a corona discharge treatment or a plasma discharge treatment has been known. Various adhesive functional groups are introduced to the surface of a tube made of the fluororesin by the above surface treatment method, and then an adhesive is applied if necessary, and a polyamide is extruded on the treated surface of the tube to obtain a laminate tube of a fluororesin and a polyamide. However, such a surface treatment method comprises complicated steps, thus lowering the productivity of the laminate tube. Further, it tends to be difficult to treat the inner surface of a fluororesin having a complicated shape by corona discharge or plasma discharge. For example, it is difficult to apply e.g. plasma discharge to the inner surface of a slender fluororesin tube.

Accordingly, a fluororesin has been strongly desired, with which no surface treatment on the fluororesin tube is required, and with which a laminate tube excellent in interlaminar adhesion can be formed by a simple method such as co-extrusion.

Heretofore, from the above viewpoint, various attempts to improve adhesion properties of a fluororesin have been made. For example, JP-A-11-193312 discloses a fluorocopolymer comprising repeating units based on maleic anhydride. Although this fluorocopolymer is excellent in adhesive properties to another material, copolymerizability of maleic anhydride with a fluoromonomer is insufficient. Thus, a special polymerization method employing as a solvent supercritical carbon dioxide, hexafluoropropylene or the like has to be employed.

Further, JP-A-2004-277689 discloses a fluorocopolymer comprising repeating units based on tetrafluoroethylene (hereinafter referred to as TFE)/repeating units based on a fluoromonomer/repeating units based on itaconic anhydride. However, for example, in the case of a terpolymer comprising TFE, $CF_2$=$CFOCF_2CF_2CF_3$ and itaconic anhydride as monomers, copolymerizability is not necessarily sufficient as shown in Comparative Example 2 described hereinafter.

Under these circumstances, it is an object of the present invention to provide a laminate hose comprising a polyamide and a fluorocopolymer which is very excellent in fuel barrier properties, which is excellent in heat resistance, chemical resistance, weather resistance and flexibility, and which is excellent in adhesive properties to a polyamide.

The present inventors have conducted extensive studies from the above viewpoint and as a result, found that a fluorocopolymer having an acid anhydride of a cyclic hydrocarbon monomer having a dicarboxylic anhydride group and having a polymerizable unsaturated group in the ring, such as 5-norbornene-2,3-dicarboxylic acid, copolymerized is excellent in adhesive properties to a polyamide, whereby the above object can be achieved. The present invention has been accomplished on the basis of this discovery.

According to the present invention, the following laminate hose comprising a fluorocopolymer and a polyamide is provided.

(1) A laminate hose comprising a laminate of a fluorocopolymer and a polyamide, wherein the fluorocopolymer comprises repeating units (a) based on tetrafluoroethylene and/or chlorotrifluoroethylene, repeating units (b) based on a cyclic hydrocarbon monomer having a dicarboxylic anhydride group and having a polymerizable unsaturated group in the ring, and repeating units (c) based on another fluoromonomer (excluding tetrafluoroethylene and chlorotrifluoroethylene) with contents of the repeating units (a) of from 50 to 99.89 mol %, the repeating units (b) of from 0.01 to 5 mol % and the repeating units (c) of from 0.1 to 49.99 mol % based on the total number of mols of the repeating units (a), (b) and (c), and has a flow coefficient of from 0.1 to 1,000 mm$^3$/sec.

(2) The laminate hose according to (1), wherein the cyclic hydrocarbon monomer is 5-norbornene-2,3-dicarboxylic anhydride.

(3) The laminate hose according to (1) or (2), wherein (c) the another fluoromonomer is at least one member selected from the group consisting of hexafluoropropylene and $CF_2$=$CFOR^{f1}$ (wherein $R^{f1}$ is a $C_{1-10}$ perfluoroalkyl group which may contain an oxygen atom between carbon atoms).

The laminate hose of the present invention is excellent in heat resistance, chemical resistance, weather resistance and fuel barrier properties, and is excellent in interlaminar adhesion, and is excellent also in durability when immersed in fuel, and is thereby suitable particularly for e.g. a fuel hose for automobiles.

Now, the present invention will be described in detail with reference to the preferred embodiments.

In the laminate hose comprising a laminate of a fluorocopolymer and a polyamide of the present invention, the fluorocopolymer comprises repeating units (a) based on tetrafluoroethylene (TFE) and/or chlorotrifluoroethylene (hereinafter referred to as CTFE), repeating units (b) based on a cyclic hydrocarbon monomer having a dicarboxylic anhydride group and having a polymerizable unsaturated group in the ring, and repeating units (c) based on another fluoromonomer (excluding TFE and CTFE).

(Acid Anhydride Group-Containing Cyclic Monomer)

The fluorocopolymer of the present invention is most characterized in that a cyclic hydrocarbon monomer (hereinafter referred to as a dicarboxylic anhydride group-containing cyclic monomer or an acid anhydride group-containing cyclic monomer) having a dicarboxylic anhydride group and a polymerizable unsaturated group in the ring is used instead of conventional itaconic anhydride.

In the present invention, the acid anhydride group-containing cyclic monomer is a polymerizable compound which is a cyclic hydrocarbon comprising at least one 5- or 6-membered ring and which has a dicarboxylic anhydride group and an endocyclic polymerizable unsaturated group.

The cyclic hydrocarbon is preferably a cyclic hydrocarbon having at least one bridged polycyclic hydrocarbon. Namely, it is preferably a cyclic hydrocarbon which is a bridged polycyclic hydrocarbon, a cyclic hydrocarbon having at least two bridged polycyclic hydrocarbons condensed, or a cyclic hydrocarbon having a bridged polycyclic hydrocarbon and another cyclic hydrocarbon condensed. Further, this acid anhydride group-containing cyclic monomer has at least one endocyclic polymerizable unsaturated group i.e. a polymerizable unsaturated group present between carbon atoms constituting the hydrocarbon ring.

The acid anhydride group-containing cyclic monomer further has a dicarboxylic anhydride group (—CO—O—CO—), and this dicarboxylic anhydride group may be bonded to two carbon atoms constituting the hydrocarbon ring, or may be bonded to two exocyclic carbon atoms. Preferably, the dicarboxylic anhydride group is bonded to adjacent two carbon atoms which are carbon atoms constituting the ring of the cyclic hydrocarbon.

Further, the carbon atom constituting the ring of the cyclic hydrocarbon may have a substituent such as an alkyl group, a halogen atom or a alkyl halide group bonded thereto instead of a hydrogen atom.

In the present invention, the dicarboxylic anhydride group-containing cyclic monomer to be used is preferably represented by the following formulae (1) to (8):

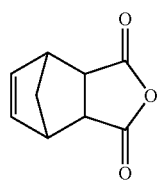
(1)

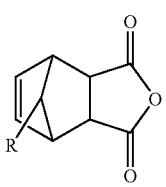
(2)

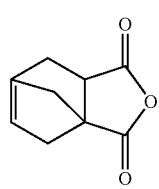
(3)

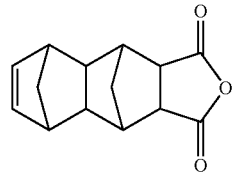
(4)

(In the above formula (2), R is a lower alkyl group having from about 1 to about 6 carbon atoms, a halogen atom selected from fluorine, chlorine, bromine and iodine, or an alkyl halide group having hydrogen in the above lower alkyl group substituted by the above halogen atom.)

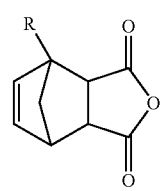
(5)

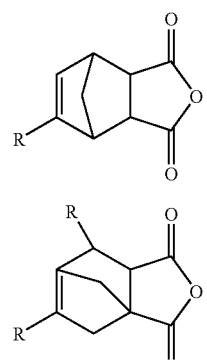
(6)

(7)

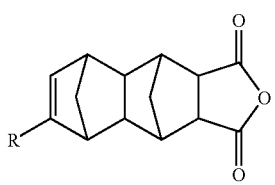
(8)

(In the above formulae (5) to (8), R is a lower alkyl group having from about 1 to about 6 carbon atoms, a halogen atom selected from fluorine, chlorine, bromine and iodine, or an alkyl halide group having hydrogen in the above lower alkyl group substituted by the above halogen atom.)

Among them, preferred are 5-norbornene-2,3-dicarboxylic anhydride (hereinafter referred to as NAH) represented by the formula (1) and compounds of the formulae (2) and (5) to (8) wherein the substituent R is a methyl group (—$CH_3$), and most preferred is NAH.

The compounds of the above formulae (1) to (8) are known compounds and easily produced, for example, by a method of heating cyclopentadiene and maleic anhydride in the absence of a catalyst, or a method as disclosed in JP-A-6-73043. Further, it is also possible to use a commercial product.

In production of the fluorocopolymer of the present invention, by using the acid anhydride group-containing cyclic monomer, a fluorocopolymer containing the repeating units (b) can be easily produced without using a special polymerization method as required when maleic anhydride is used as disclosed in JP-A-11-193312 and without a decrease in copolymerizability as in the case of using itaconic anhydride as disclosed in JP-A-2004-277689.

(Another Fluoromonomer)

In the present invention, another fluoromonomer (c) is a fluoromonomer other than TFE and CTFE, and it may, for example, be vinyl fluoride, vinylidene fluoride (hereinafter referred to as VDF), trifluoroethylene, hexafluoropropylene (hereinafter referred to as HFP), $CF_2=CFOR^{f1}$ (wherein $R^{f1}$ is a $C_{1-10}$ perfluoroalkyl group which may contain an oxygen atom between carbon atoms), $CF_2=CFOR^{f2}SO_2X^1$ (wherein $R^{f2}$ is a $C_{1-10}$ perfluoroalkylene group which may contain an oxygen atom between carbon atoms, and $X^1$ is a halogen atom or a hydroxyl group), $CF_2=CFOR^{f2}CO_2X^2$ (wherein $R^{f2}$ is as defined above, and $X^2$ is a hydrogen atom or a $C_{1-3}$ alkyl group), $CF_2=CF(CF_2)_pOCF=CF_2$ (wherein p is 1 or 2), $CH_2=CX^3(CF_2)_qX^4$ (wherein each of $X^3$ and $X^4$ which are independent of each other, is a hydrogen atom or a fluorine atom, and q is an integer of from 2 to 10) or perfluoro(2-methylene-4-methyl-1,3-dioxolane). They may be used alone or in combination.

Specifically, $CF_2=CFOR^{f1}$ may, for example, be $CF_2=CFOCF_2CF_3$, $CF_2=CFOCF_2CF_2CF_3$, $CF_2=CFOCF_2CF_2CF_2CF_3$ or $CF_2=CFO(CF_2)_8F$, preferably $CF_2=CFOCF_2CF_2CF_3$.

Further, $CH_2=CX^3(CF_2)_qX^4$ may, for example, be $CH_2=CH(CF_2)_2F$, $CH_2=CH(CF_2)_3F$, $CH_2=CH(CF_2)_4F$, $CH_2=CF(CF_2)_3H$ or $CH_2=CF(CF_2)_4H$, preferably $CH_2=CH(CF_2)_4F$ or $CH_2=CH(CF_2)_2F$.

The another fluoromonomer (c) is preferably VDF, HFP, $CF_2=CFOR^{f1}$ or $CH_2=CX^3(CF_2)_qX^4$, more preferably HFP or $CF_2=CFOR^{f1}$.

In the fluorocopolymer of the present invention, based on the total number of mols of the repeating units (a), the repeating units (b) and the repeating units (c), the content of (a) is from 50 to 99.89 mol %, the content of (b) is from 0.01 to 5 mol %, and the content of (c) is from 0.1 to 49.99 mol %. Preferably, the content of (a) is from 50 to 99.47 mol %, the content of (b) is from 0.03 to 3 mol % and the content of (c) is from 0.5 to 49.97 mol %. More preferably, the content of (a) is from 50 to 98.95 mol %, the content of (b) is from 0.05 to 2 mol % and the content of (c) is from 1 to 49.95 mol %.

When the contents of the repeating units (a), the repeating units (b) and the repeating units (c) are within the above range, the fluorocopolymer will be excellent in heat resistance and chemical resistance. Further, when the content of (b) is within this range, the fluorocopolymer will be excellent in adhesive properties to a polyamide. Further, when the content of (c) is within this range, the fluorocopolymer will be excellent in moldability and is excellent also in mechanical properties such as stress crack resistance.

(Non-Fluoromonomer)

For the copolymer of the present invention, a (d) non-fluoromonomer may be added and copolymerized at the time of polymerization. The non-fluoromonomer (d) may, for example, be a $C_{2-4}$ olefin such as ethylene, propylene or isobutene, a vinyl ester such as vinyl acetate, methyl(meth)acrylate, ethyl(meth)acrylate, n-butyl(meth)acrylate or methyl crotonate, or a vinyl ether such as ethyl vinyl ether or cyclohexyl vinyl ether. Among them, ethylene, propylene or vinyl acetate is preferred, and ethylene is more preferred. They may be used alone or in combination.

In a case where repeating units based on the non-fluoromonomer (d) are incorporated, the content of (d) is preferably such that the molar ratio of $((a)+(b)+(c))/(d)$ is at a level of from 100/5 to 100/100. If the content of (d) is very low as compared with this range, no substantial effect of incorporation will be achieved, and if it is too high, a tube which is a product molded from the resulting fluorocopolymer tends to have lowered heat resistance and chemical resistance.

(Example of Fluorocopolymer)

Preferred specific examples of the fluorocopolymer of the present invention comprising the repeating units (a), (b) and (c) and further comprising the repeating units (d) if necessary include terpolymers and tetrapolymers such as a TFE/$CF_2=CFOCF_2CF_2CF_3$/NAH copolymer, a TFE/HFP/NAH copolymer, a TFE/$CF_2=CFOCF_2CF_2CF_3$/HFP/NAH copolymer, a TFE/VdF/NAH copolymer, a TFE/$CH_2=CH(CF_2)_4F$/NAH/ethylene copolymer, a TFE/$CH_2=CH(CF_2)_2F$/NAH/ethylene copolymer, a CTFE/$CH_2=CH(CF_2)_4F$/NAH/ethylene copolymer, a CTFE/$CH_2=CH(CF_2)_2F$/NAH/ethylene copolymer and a CTFE/$CH_2=CH(CF_2)_2F$/NAH/ethylene copolymer.

More preferred are a TFE/$CF_2=CFOCF_2CF_2CF_3$/NAH copolymer, a TFE/HFP/NAH copolymer and a TFE/$CF_2=CFOCF_2CF_2CF_3$/HFP/NAH copolymer.

(Melting Point and Q Value, etc.)

The melting point of the fluorocopolymer of the present invention is preferably from 150 to 320° C. in relation to the molding temperature, more preferably from 200 to 310° C. A range of from 150 to 320° C. is preferred since the fluorocopolymer tends to be excellent in melt co-extrudability with a thermoplastic resin such as a polyamide. Further, the melting point is preferably adjusted by suitably selecting the contents of the repeating units (a), (b) and (c) and the content of (d) as the case requires within the above range.

The fluorocopolymer of the present invention preferably has as a polymer terminal group an adhesive functional group such as an ester group, a carbonate group, a hydroxyl group, a carboxyl group, a carbonyl fluoride group or an acid anhydride residue, whereby it will be excellent in adhesive properties to a thermoplastic resin such as a polyamide. The polymer terminal group having such an adhesive functional group is preferably introduced by suitably selecting a radical polymerization initiator, a chain transfer agent, etc. at the time of production of the fluorocopolymer.

The flow coefficient (hereinafter referred to as Q value) of the fluorocopolymer of the present invention is from 0.1 to 1,000 $mm^3$/sec. The Q value is an index of the melt Theological characteristics of a fluorocopolymer and is an indication of the molecular weight. A high Q value means a low molecular weight and a low value means a high molecular weight. The Q value in the present invention is an extrusion rate of a fluorocopolymer when it is extruded into an orifice with a diameter of 2.1 mm and a length of 8 mm under a load of 7 kg at a temperature higher by 50° C. than the melting point of the fluorocopolymer by using flow tester manufactured by Shimadzu Corporation. If the Q value is too low, extrusion tends to be difficult, and if it is too high, mechanical strength of the fluorocopolymer tends to decrease. The Q value of the fluorocopolymer of the present invention is preferably from 0.5 to 500 $mm^3$/sec, more preferably from 1.0 to 200 $mm^3$/sec.

(Polymerization Method)

A method for producing the fluorocopolymer of the present invention is not particularly limited since a specific acid anhydride group-containing cyclic monomer is used and copolymerizability is thereby excellent, and a radical polymerization method using a known radical polymerization initiator is employed. The polymerization method may, for example, be self-polymerization; solution polymerization using an organic solvent such as a fluorohydrocarbon, a chlorohydrocarbon, a chlorofluorohydrocarbon, an alcohol or a hydrocarbon; suspension polymerization using an aqueous medium and an appropriate organic solvent as the case requires; or emulsion polymerization using an aqueous medium and an emulsifier, and it is particularly preferably solution polymerization.

With respect to the radical polymerization initiator, the temperature at which the half life is 10 hours is preferably from 0 to 100° C., more preferably from 20 to 90° C.

Specifically, the polymerization initiator may, for example, be preferably an azo compound such as azobisisobutyronitrile; a non-fluorinated diacyl peroxide such as isobutyryl peroxide, octanoyl peroxide, benzoyl peroxide or lauroyl peroxide; a peroxydicarbonate such as diisopropyl peroxydicarbonate or di-n-propyl peroxydicarbonate; a peroxyester such as tert-butyl peroxypivalate, tert-butyl peroxyisobutyrate or tert-butyl peroxyacetate; a fluorinated diacyl peroxide such as a compound represented by $(Z(CF_2)_rCOO)_2$ (wherein Z is a hydrogen atom, a fluorine atom or a chlorine atom, and r is an integer of from 1 to 10); or an inorganic peroxide such as potassium persulfate, sodium persulfate or ammonium persulfate.

In the present invention, it is also preferred to use a chain transfer agent so as to control the Q value of the fluorocopolymer. The chain transfer agent may, for example, be an alcohol such as methanol or ethanol; a chlorofluorohydrocarbon such as 1,3-dichloro-1,1,2,2,3-pentafluoropropane or 1,1-dichloro-1-fluoroethane; or a hydrocarbon such as pentane, hexane or cyclohexane. The chain transfer agent to introduce an adhesive functional group to the polymer terminal of the fluorocopolymer may, for example, be acetic acid, acetic anhydride, methyl acetate, ethylene glycol or propylene glycol.

In the present invention, the polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa.

The concentration of the acid anhydride-containing cyclic hydrocarbon monomer during the polymerization is preferably from 0.01 to 5 mol %, more preferably from 0.1 to 3 mol %, most preferably from 0.1 to 1 mol % based on all the monomers. If the concentration of the acid anhydride-containing cyclic hydrocarbon monomer is too high, the polymerization rate tends to decrease. When it is within a range of from 0.01 to 5 mol %, the polymerization rate during the polymerization will not decrease and the fluorocopolymer to be obtained will be excellent in adhesive properties. As the acid anhydride-containing cyclic hydrocarbon monomer is consumed for the polymerization, it is preferred to continuously or intermittently supply the monomer in an amount consumed to the polymerization vessel during the polymerization thereby to maintain the concentration of the monomer within this range.

The fluorocopolymer of the present invention itself is very excellent in fuel barrier properties. The fuel permeability coefficient (unit: $g \cdot mm/m^2 \cdot 24 \, h$) of the film which is an index of the fuel barrier properties is measured by a method as disclosed in Examples, and the smaller this value, the more excellent the fuel barrier properties. The fuel permeability coefficient of the film of the fluorocopolymer is preferably from 0.01 to 1.5 $g \cdot mm/m^2 \cdot day$, more preferably from 0.05 to 1 $g \cdot mm/m^2 \cdot day$, most preferably from 0.1 to 0.5 $g \cdot mm/m^2 \cdot day$.

(Lamination with Polyamide)

In the present invention, as the polyamide (PA) to be laminated with the fluorocopolymer to form a laminate hose, known one may be suitably used. Namely, since the fluorocopolymer of the present invention itself has high adhesive properties to a polyamide resin, the polyamide is not particularly limited. For example, a polyamide such as polyamide 6, polyamide 66, polyamide 46, polyamide 11, polyamide 12 or polyamide MXD6 (semiaromatic polyamide) may be mentioned.

Another known polyamide which can be used may, for example, be polyamide 26, polyamide 69, polyamide 610, polyamide 611, polyamide 612, polyamide 6T, polyamide 6I, polyamide 912, polyamide 1012, polyamide 1212 or polyamide PACM12. The above polyamides may be used alone or in combination. Further, a copolymerized polyamide using raw material monomers forming the above polyamides may also be used.

It is preferred to impart electrical conductivity to the fluorocopolymer constituting the innermost layer to be in contact with fuel when the laminate hose of the present invention is used for transport of liquid fuel, so that static electricity to be generated at the time of transport of a fluid such as liquid fuel can be removed. The electrical conductivity is preferably developed by addition of an electrical conductivity-imparting filler to the innermost layer of the laminate hose.

The electrical conductivity-imparting filler may be any filler which is conventionally used, and it may, for example, be a metal powder of e.g. nickel or silver; metal fibers of e.g. iron or stainless steel; electrically conductive carbon black; or a metal inorganic compound having surface of e.g. zinc oxide, glass beads or titanium oxide coated by e.g. metal sputtering or electroless plating. Among them, electrically conductive carbon black is most preferred. The amount of the filler is from 1 to 30 parts by mass, particularly at a level of from 5 to 20 parts by mass based on 100 parts by mass of the fluorocopolymer constituting the inner layer. The volume specific resistivity which is an indicator of the electrical conductivity is preferably at most $1 \times 10^9 \, \Omega cm$.

(Layer Structure of Laminate Hose, etc.)

The laminate hose of the present invention is a laminate having a laminate structure having an inner layer (I) made of the fluorocopolymer in the present invention and an outer layer (II) made of a polyamide i.e. a basic laminate structure of [(II)/(I)].

The laminate hose of the present invention may be a multilayer hose containing a layer made of another fluororesin or polyamide so long as it has the above basic laminate structure i.e. it has such a structure that the inner layer (I) made of the fluorocopolymer and the outer layer (II) made of a polyamide are laminated in direct contact with each other. In the case of a multilayer hose, the total number of layers is not particularly limited and is at least two layers, and it is usually from 2 to 6 layers, more preferably from 2 to 5 layers. For example, the following layer structure may be mentioned.

(1) (II)/(I): The inner layer (I) is made of the fluorocopolymer as defined in the present invention, and it may be an electrically conductive fluorocopolymer having electrical conductivity imparted.

(2) (II)/(I)/(I'): The innermost layer (I') is a layer made of a fluororesin having electrical conductivity imparted. Usually it is a layer made of a fluororesin other than the fluororesin as defined in the present invention, but an innermost layer (I') made of the fluororesin defined in the present invention is not excluded (the same applies hereinafter).

(3) (II')/(II)/(I)/(I'): The outermost layer (II') is a layer made of another polyamide resin other than the polyamide resin for the outer layer (II).

Further, for the laminate hose of the present invention, lamination of a layer made of a heat resistant thermoplastic resin is not excluded. Further, to such layers, a filler such as glass fibers or carbon fibers may be incorporated.

The outer diameter of the laminate hose of the present invention is suitably designed considering the flow rate of fuel for which the laminate hose is used, and the thickness is designed so that permeability of the fuel is sufficiently small, that the burst pressure of a conventional hose can be maintained, and that flexibility can be maintained to such an extent that assembling of the hose can be easily carried out and favorable vibration resistance during use will be obtained. The diameter and the thickness are not particularly limited, but it is usually preferred that the outer diameter is at a level of from 4 to 30 mm, the inner diameter is at a level of from 3 to 25 mm and the thickness is at a level of from 0.05 to 5 mm.

Further, the thicknesses of the respective layers of the laminate hose of the present invention are not particularly limited and suitably changed depending upon e.g. physical properties of the resin, the total number of layers and purpose of use, and determined considering characteristics of the laminate hose, such as fuel barrier properties, impact resistance at low temperature and flexibility.

Specifically, the thicknesses of the inner layer (I) and the outer layer (II) are preferably from 3 to 90%, respectively, based on the total thickness of the laminate hose, and the thickness of the inner layer (I) is more preferably from 5 to 80%, furthermore preferably from 10 to 50% based on the total thickness of the laminate hose, considering the fuel barrier properties. As one example, a laminate hose having an outer diameter of 8 mm, an inner diameter of 6 mm and a thickness of 1 mm (inner layer 0.25 mm, outer layer 0.75 mm) may be mentioned.

(Formation of Laminate Hose)

Formation of the laminate hose of the present invention is carried out usually most preferably by co-extrusion of co-extruding the polyamide to form the outer layer and the fluorocopolymer to form the inner layer in a molten state and heat-sealing (melt-bonding) them to form a hose having a two-layer structure all at once. Further, a laminate hose having a laminate structure of three layers or more can be formed by co-extrusion in accordance with the above method.

Usually, co-extrusion is a method of obtaining a laminate consisting of two or more layers in the form of a film or a tube. Namely, melts of the resins to form the respective layers, which are kneaded and melted in two or more extruders equipped with a screw and discharged from the outlets, are extruded through dies provided at the end of the extruders while they are in contact with each other in a molten state and formed into a laminate.

With respect to the extrusion temperature, the screw temperature is preferably from 100 to 350° C., and the die temperature is preferably from 200 to 350° C. The number of revolution of the screw is not particularly limited but is preferably from 10 to 200 rpm, and the retention time of the melt in the extruder is preferably from 1 to 20 minutes.

Further, generally, it is also preferred to preliminarily pelletize the resins for the outer layer and the inner layer as described in Examples mentioned hereinafter. Namely, the fluorocopolymer and the polyamide are mixed with predetermined amounts of a resin to be mixed and various additives such as a plasticizer by means of a low speed rotation mixer such as a V blender or a tumbler or a high speed rotation mixer such as a Henschel mixer, and the mixture is melt-kneaded by e.g. a single screw extruder, a twin screw extruder or a twin screw kneader and pelletized. A plasticizer or the like which is liquid at room temperature may be injected in the middle of the cylinder of the melt kneader and melt-kneaded.

Pelletizing is carried out preferably by mechanical kneading at a temperature at which all the resin components are melted. Particularly for uniform mixing, it is preferred to use a co-rotation twin screw extruder.

Further, at the time of co-extrusion, it is also possible to supply all the constituents forming the compositions of the respective layers to hoppers of the respective extruders for e.g. compounding of the respective layers in the extruders, and then carry out co-extrusion thereby to carry out compounding or the like and co-extrusion substantially simultaneously.

The laminate hose of the present invention is characterized in that it is formed only by co-extrusion or the like particularly without a conventional troublesome surface treatment on the fluorocopolymer, and that it is very excellent in interlaminar adhesion. Namely, the adhesive force between the fluorocopolymer layer and the polyamide resin layer is preferably at least 15 N/cm, more preferably at least 20 N/cm as the peel strength between both the layers.

(Fuel Permeability of Laminate Hose)

The laminate hose of the present invention is applicable to a use as a fuel hose particularly excellent in fuel barrier properties. With respect to the fuel permeability coefficient (unit: $mg/m^2 \cdot day$) of the laminate hose measured in accordance with a method disclosed in Examples, which is an index of the fuel barrier properties, the smaller the value, the more excellent the fuel barrier properties. The fuel permeability coefficient of the laminate hose is preferably from 2 to 150 $mg/m^2 \cdot day$, more preferably from 3 to 100 $mg/m^2 \cdot day$, most preferably from 5 to 80 $mg/m^2 \cdot day$.

EXAMPLES

Now, the present invention will be described in further detail with reference to Examples. However, it should be understood that the present invention is by no means restricted to such specific Examples. % means mass % unless otherwise specified.

The adhesive strength (interlaminar peel strength), the fuel permeability coefficient and the content of NAH of a film and a hose were measured in accordance with the following methods.

(i) Fuel Permeability Coefficient (Unit: $g \cdot mm/m^2 \cdot 24$ h) of the Film The fuel permeability coefficient of a fluorocopolymer was measured in accordance with a dish method as defined in JIS Z-0208. 9.5 to 10 g of CE10 (volume ratio of isooctane:toluene:ethanol=50/50/10) as fuel was put in a dish having a permeation area of 28.26 $cm^2$. The cup was covered with a film made of a fluorocopolymer having a thickness of 100 μm, obtained by hot pressing, and the fuel permeability coefficient was determined from the loss in the mass after the cup was held at 60° C. for 10 days. A low fuel permeability coefficient means excellent fuel barrier properties.

(ii) Content (Unit: mol %) of Repeating Units Based on NAH

An infrared absorption spectrum was measured by using a 100 μm fluorocopolymer film. As the absorption peak of NAH appears at 1,778 cm$^{-1}$ in the infrared absorption spectrum, the absorbance of this peak was measured. Employing the molar absorption coefficient of 1,340 l·mol$^{-1}$·cm$^{-1}$, the content of the repeating units based on NAH was calculated.

(iii) Content (Unit: mol %) of Repeating Units Based on CF$_2$=CFO (CF$_2$)$_3$F Calculated by melt NMR analysis in accordance with a method as disclosed in Reports of the Research Laboratory, Asahi Glass Co., Ltd., 40(1), 75 (1990).

(iv) Interlaminar Peel Strength

A laminate hose was cut into a piece with a length of 20 cm, which was further cut lengthwise to prepare a test specimen. The outer layer and the inner layer were forcibly separated 1 cm from the end, and using a TENSILON universal testing machine, the outer layer and the inner layer were pinched, and 180° adhesive test was carried out at a pulling rate of 50 mm/min. The maximum strength was read from the maximum point of the S-S curve to determine the interlaminar peel strength (N/cm).

(v) Fuel Immersion Test

A laminate hose cut into a length of 20 cm and CM15 (fuel with a volume ratio of isooctane:toluene:methanol=50:50: 15) or CE10 were put in a pressure resistance container, sealed and held at 60° C. for a predetermined time. With respect to this sample, the interlaminar peel strength was measured in accordance with the above (iv).

(vi) Fuel Permeability Coefficient (Unit: mg/m$^2$·Day) of Hose

A laminate hose (tube) was cut into a length of 1 m, CE10 or CM15 was enclosed in the cut hose, and the mass of the laminate hose with the fuel was measured. The laminate hose was held in a thermostatic chamber at 60° C. for 20 days, and the change in the mass (loss in the mass) was obtained to calculate the permeability coefficient of the hose.

Preparation Example 1

(1) A polymerization vessel having an internal volume of 100 L equipped with a stirrer was deaerated, and then 42.5 kg of 1,3-dichloro-1,1,2,2,3-pentafluoropropane (AK225cb, manufactured by Asahi Glass Company, Limited, hereinafter referred to as AK225cb), 2.125 kg of CF$_2$=CFO(CF$_2$)$_3$F and 51 kg of HFP were charged. Then, the temperature in the interior of the polymerization vessel was increased to 50° C., and 4.25 kg of TFE was charged to increase the pressure to 1.01 MPa/G. As a polymerization initiator solution, 340 cm$^3$ of a 0.3 mass % AK225cb solution of (perfluorobutyryl) peroxide was charged to initiate the polymerization, and 340 cm$^3$ of the polymerization initiator solution was charged every 10 minutes.

During the polymerization, TFE was continuously charged so as to maintain a pressure of 1.01 MPa/G. Further, a 0.3 mass % AK225cb solution of NAH (5-norbornene-2,3-dicarboxylic anhydride represented by the formula 1 was used) was continuously charged in an amount equivalent to 0.1 mol % based on the number of mols of TFE to be charged during the polymerization.

5 Hours after initiation of the polymerization, upon charging of 8.5 kg of TFE, the temperature in the interior of the polymerization vessel was decreased to room temperature and unreacted monomers were purged to normal pressure.

The obtained fluorocopolymer in the form of a slurry was put in a 200 L granulation vessel into which 75 kg of water was charged, and the temperature was increased to 105° C. with stirring for granulation while distilling the solvent off. The obtained granules were dried at 150° C. for 5 hours to obtain 7.5 kg of granules (hereinafter referred to as granules 1) of a fluorocopolymer (hereinafter referred to as fluorocopolymer 1).

(2) As a result of melt NMR analysis and infrared absorption spectrum analysis, the copolymer composition of the fluorocopolymer 1 was such that repeating units based on TFE/ repeating units based on CF$_2$=CFO(CF$_2$)$_3$F/repeating units based on HFP/repeating units based on NAH=91.2/1.5/7.2/ 0.1 (mol %). The melting point was 262° C. and the Q value was 4.6 mm$^3$/sec.

The fluorocopolymer 1 was hot-pressed to obtain a film having a thickness of 100 μm, and its fuel permeability coefficient was measured and as a result, it was 0.38 g·mm/m$^2$·24 h.

Preparation Example 2

(1) The polymerization vessel used in Preparation Example 1 is deaerated, and 23.1 kg of AK225cb, 2.3 g of methanol, 0.96 kg of CF$_2$=CFO(CF$_2$)$_3$F, 61.5 kg of HFP and 3.85 kg of TFE are charged. Then, the temperature in the interior of the polymerization vessel is increased to 50° C. The pressure is 1.17 MPa/G. As a polymerization initiator solution, 340 cm$^3$ of a 0.3 mass % AK225cb solution of di(perfluorobutyryl)peroxide is charged to initiate the polymerization, and 340 cm$^3$ of the polymerization initiator solution is charged every 10 minutes. Further, TFE is continuously charged so as to maintain a pressure during the polymerization of 1.17 MPa/G. Further, a 0.3 mass % AK225cb solution of NAH (5-norbornene-2,3-dicarboxylic anhydride represented by the formula 1) is continuously charged in an amount equivalent to 0.1 mol % of TFE to be continuously charged. 4 Hours and 30 minutes after initiation of the polymerization, upon charging of 8.5 kg of TFE, the temperature in the interior of the polymerization vessel is cooled to room temperature, and unreacted monomers are purged.

The obtained fluorocopolymer (hereinafter referred to as fluorocopolymer 2) in the form of a slurry is put in a 200 L granulation vessel into which 75 kg of water is charged, and the temperature is increased to 105° C. with stirring for granulation while distilling the solvent off. The obtained granules are dried at 150° C. for 5 hours to obtain 6.9 kg of granules (hereinafter referred to as granules 2) of the fluorocopolymer 2.

(2) As a result of melt NMR analysis and infrared absorption spectrum analysis, the copolymer composition of the fluorocopolymer 2 is such that repeating units based on TFE/repeating units based on CF$_2$=CFO(CF$_2$)$_3$F/repeating units based on HFP/repeating units based on NAH=89.0/0.7/10.2/0.1 (mol %). The melting point is 257° C., and the Q value is 2.8 mm$^3$/sec. The fluorocopolymer 2 is hot-pressed to obtain a film having a thickness of 100 μm, and its fuel permeability coefficient is measured and as a result, it is 0.30 g·mm/m$^2$·24 h.

Example 1

(1) The granules 1 prepared in Preparation Example 1 were melt-kneaded by using an extruder at 300° C. for a retention time of 2 minutes to prepare pellets 1.

Pellets of polyamide 12 (3030JLX2 manufactured by UBE INDUSTRIES, LTD.) were supplied to a cylinder for formation of the outer layer and the pellets 1 were supplied to a cylinder for formation of the inner layer, and they were respectively transferred to transport zones of the cylinders.

The heating temperatures at the transport zones for the polyamide 12 and the pellets 1 were 240° C. and 290° C., respectively. Two-layer co-extrusion was carried out at a common die temperature of 290° C. to obtain a two-layered laminate tube. The laminate tube had an outer diameter of 8 mm, an inner diameter of 6 mm and a thickness of 1 mm, the outer layer made of the polyamide 12 had a thickness of 0.8 mm, and the inner layer made of the fluorocopolymer 1 had a thickness of 0.2 mm.

(2) The interlaminar peel strength of the obtained tube was measured. The inner layer made of the fluorocopolymer 1 and the outer layer made of the polyamide 12 were not separated, and the peel strength was extremely strong and could not be measured. Further, the peel strength after immersion in CM15 for 24 hours was 25 N/cm, the peel strength after immersion for 161 hours was 22 N/cm, the peel strength after immersion in CE10 for 24 hours could not be measured since the layers were not separated, and the peel strength after immersion for 161 hours was 20 N/cm, and thus the peel strength was sufficiently high.

Further, when CE10 or CM15 was enclosed in the hose, the permeability coefficient was 28.5 mg/m²·day in the case of CE10 and 66.0 mg/m² day in the case of CM15.

Example 2

(1) The granules 2 prepared in Preparation Example 2 are melt-kneaded by using an extruder at 300° C. for a retention time of 2 minutes to prepare pellets 2.

Pellets of polyamide 12 (3030JLX2 manufactured by UBE INDUSTRIES, LTD.) are supplied to a cylinder for formation of the outer layer and the pellets 2 are supplied to a cylinder for formation of the inner layer, and they are respectively transferred to transport zones of the cylinders.

The heating temperatures at the transport zones for the polyamide 12 and the pellets 1 are 240° C. and 290° C., respectively. Two-layer co-extrusion is carried out at a common die temperature of 290° C. to obtain a two-layered laminate tube. The laminate tube has an outer diameter of 8 mm, an inner diameter of 6 mm and a thickness of 1 mm, the outer layer made of the polyamide 12 has a thickness of 0.8 mm and the inner layer made of the fluorocopolymer 2 has a thickness of 0.2 mm.

(2) The interlaminar peel strength of the obtained tube is measured, whereupon the peel strength between the inner layer made of the fluorocopolymer 2 and the outer layer made of the polyamide 12 is extremely strong and can not be measured since the layers are not separated. Further, the peel strength after immersion in CM15 for 24 hours is 28 N/cm, the peel strength after immersion for 161 hours is 25 N/cm, the peel strength after immersion in CE10 for 24 hours is extremely strong and can not be measured since the layers are not separated, and the peel strength after immersion for 161 hours is 24 N/cm, and thus the peel strength is sufficiently high.

Comparative Example 1

Polymerization and granulation are carried out in the same manner as in Preparation Example 1 except that no 0.3 mass % AK225cb solution of NAH is charged, to obtain a fluorocopolymer (hereinafter referred to as fluorocopolymer 3) and 7.6 kg of granules (hereinafter referred to as granules 3) of the fluorocopolymer 3.

As a result of melt NMR analysis, the copolymer composition of the fluorocopolymer 3 is such that repeating units based on TFE/repeating units based on $CF_2$=$CFO(CF_2)_3F$/repeating units based on HFP=91.5/1.5/7.0 (mol %). The melting point is 257° C., and the Q value is 3.0 mm³/sec. The fluorocopolymer 3 is hot-pressed to obtain a film having a thickness of 100 μm, and its fuel permeability coefficient is measured and as a result, it is 0.33 g·mm/m²·24 h.

Pellets 3 are prepared from the granules 3 in the same manner as in Example 1.

Pellets of polyamide 12 (3030JLX2 manufactured by UBE INDUSTRIES, LTD.) are supplied to a cylinder for formation of the outer layer and the pellets 3 are supplied to a cylinder for formation of the inner layer, and they are respectively transferred to transport zones of the cylinders.

The heating temperatures at the transport zones for the polyamide 12 and the pellets 3 are 240° C. and 290° C., respectively. Two-layer co-extrusion is carried out at a common die temperature of 290° C. to obtain a two-layered laminate tube. The laminate tube has an outer diameter of 8 mm, an inner diameter of 6 mm and a thickness of 1 mm, the outer layer made of the polyamide 12 had a thickness of 0.8 mm and the inner layer made of the fluorocopolymer 3 has a thickness of 0.2 mm.

The interlaminar peel strength of the obtained tube is measured and as a result, it is 0.5 N/cm, and the inner layer made of the fluorocopolymer 3 does not substantially adhere to the outer layer made of the polyamide 12.

Comparative Example 2

(1) A polymerization vessel having an internal volume of 94 L equipped with a stirrer was deaerated, and 902 kg of AK225cb, 0.216 kg of methanol, 31.6 kg of $CF_2$=$CFOCF_2CF_2CF_3$ and 0.43 kg of IAH (itaconic anhydride) were charged. The temperature in the interior of the polymerization vessel was increased to 50° C., and TFE was charged until the pressure became 0.38 MPa. As a polymerization initiator solution, 50 cm³ of a 0.25% AK225cb solution of di(perfluorobutyryl)peroxide was charged to initiate the polymerization. During the polymerization, TFE was continuously charged so that the pressure would be constant. The polymerization initiator solution was suitably added so as to keep the charge rate of TFE substantially constant. Totally 120 cm³ of the polymerization initiator solution was charged. Further, IAH in an amount equivalent to 1 mol % of TFE to be continuously charged was continuously charged. 6 Hours after initiation of the polymerization, upon charging of 7.0 kg of TFE, the temperature in the interior of the polymerization vessel was cooled to room temperature and unreacted TFE was purged.

The obtained fluorocopolymer (hereinafter referred to as fluorocopolymer 4) in the form of a slurry was charged into a 200 L granulation vessel into which 75 kg of water was charged, and the temperature was increased to 105° C. with stirring for granulation while distilling the solvent off. The obtained granules were dried at 150° C. for 5 hours to obtain 7.5 kg of granules (hereinafter referred to as granules 4) of the fluorocopolymer 4.

(2) As a result of melt NMR analysis, fluorine content analysis and infrared absorption spectrum analysis, the composition of the fluorocopolymer 4 was such that the polymerization units based on TFE/polymerization units based on $CF_2$=$CFOCF_2CF_2CF_3$/polymerization units based on IAH=97.7/2.0/0.3. The melting point was 292° C., the softening temperature was 280° C., and the Q value was 15 mm³/sec.

The granules 4 of the fluorocopolymer 4 were pressed at 340° C. to obtain a sheet having a thickness of 1 mm, a width of 2.5 cm and a length of 10 cm. The sheet was visually observed and as a result, a significantly uneven portion was confirmed. This is estimated to be because when itaconic anhydride is used instead of 5-norbornene-2,3-dicarboxylic anhydride, copolymerizability is not sufficient as in Preparation Example 1, and a significant part of itaconic anhydride remains uncopolymerized and thus the obtained terpolymer is uneven.

Comparative Example 3

(1) A polymerization vessel having an internal volume of 94 L equipped with a stirrer was deaerated, 92.1 kg of 1-hydrotridecafluorohexane, 16.3 kg of AK225cb, 73 g of (perfluoroethyl)ethylene $CH_2=CH(CF_2)_2F$ and 10.1 g of IAH were charged, and 9.6 kg of TFE and 0.7 kg of E (ethylene) were injected. The temperature in the interior of the polymerization vessel was increased to 66° C., and as a polymerization initiator, 433 cm³ of a 1 mass % AK225cb solution of tert-butyl peroxypivalate was charged to initiate the polymerization.

A monomer gas mixture of TFE/E in a molar ratio of 60/40 was continuously charged so that the pressure would be constant during the polymerization. Further, (perfluoroethyl)ethylene in an amount equivalent to 2.0 mol % and IAH in an amount equivalent to 0.5 mol % based on the total number of mols of TFE and E to be charged during the polymerization, were continuously charged.

5.5 Hours after initiation of the polymerization, upon charging of 8.0 kg of the monomer gas mixture and 63 g of IAH, the temperature in the interior of the polymerization vessel was decreased to room temperature, and unreacted monomers were purged to recover the pressure to normal pressure.

The obtained fluorocopolymer (hereinafter referred to as fluorocopolymer 5) in the form of a slurry was put into a 200 L granulation vessel into which 75 kg of water was charged, and the temperature was increased to 105° C. with stirring for granulation while distilling the solvent off to obtain granules (hereinafter referred to as granules 5) of the fluorocopolymer 5.

(2) As a result of melt NMR analysis, IR analysis and fluorine content analysis, the copolymer composition of the fluorocopolymer 5 was such that repeating units based on TFE/repeating units based on E/repeating units based on (perfluoroethyl)ethylene/repeating units based on IAH=58.5/39/2/0.5 (mol %). The fluorocopolymer 5 had a melting point of 240° C. and a flow coefficient Q of 15 mm³/sec.

(3) Pellets 5 were prepared from the granules 5 in the same manner as in Example 1.

Pellets of polyamide 12 (3030JLX2 manufactured by UBE INDUSTRIES, LTD.) were supplied to a cylinder for formation of the outer layer, the pellets 5 were supplied to a cylinder for formation of the inner layer, and they were respectively transferred to transport zones of the cylinders.

The heating temperatures at the transport zones for the polyamide 12 and the pellets 5 were 240° C. and 290° C., respectively. Two-layer co-extrusion was carried out at a common die temperature of 290° C. to obtain a two-layered laminate tube. The laminate tube had an outer diameter of 8 mm, an inner diameter of 6 mm and a thickness of 1 mm, the outer layer made of the polyamide 12 had a thickness of 0.75 mm, and the inner layer made of the fluorocopolymer 5 had a thickness of 0.25 mm.

(4) The interlaminar peel strength of the obtained tube was measured. The inner layer made of the fluorocopolymer 5 and the outer layer made of the polyamide 12 were not separated, and the peel strength was extremely strong and could not be measured. Further, the peel strength after immersion in CM15 for 24 hours was 25 N/cm, the peel strength after immersion for 161 hours was 22 N/cm, the peel strength after immersion in CE10 for 24 hours could not be measured since the layers were not separated, and the peel strength after immersion for 161 hours was 20 N/cm, and thus the peel strength was high.

Further, when CE10 or CM15 was enclosed in the hose, the permeability coefficient was 188.5 mg/m²·day in the case of CE10 and 268.0 mg/m²·day in the case of CM15, and no favorable results were obtained with respect to the fuel permeability (fuel barrier properties) of the laminate tube.

The laminate hose of the present invention is excellent in heat resistance, chemical resistance, weather resistance and fuel barrier properties, and is further excellent in interlaminar adhesion, and is excellent also in durability when immersed in fuel as disclosed in Examples, and it is thereby very suitable particularly for e.g. a fuel hose for automobiles.

The entire disclosure of Japanese Patent Application No. 2005-121325 filed on Apr. 19, 2005 including specification, claims and summary is incorporated herein by reference in its entirety.

What is claimed is:

1. A hose comprising:
an inner layer comprising a fluorocopolymer and
an outer layer comprising a polyamide,
wherein
the inner layer is laminated to the outer layer,
the fluorocopolymer comprises, based on the total number of mols of the repeating units:
from 50 to 99.89 mol % of repeating units (a) based on tetrafluoroethylene and/or chlorotrifluoroethylene,
from 0.01 to 5 mol % of repeating units (b) based on a cyclic hydrocarbon monomer having a dicarboxylic anhydride group and having a polymerizable unsaturated group in the ring, and
from 0.1 to 49.99 mol % of repeating units (c) based on a fluoromonomer which is not tetrafluoroethylene or chlorotrifluoroethylene, and
a flow coefficient of the fluorocopolymer is in the range from 0.1 to 1,000 mm³/sec.

2. The hose according to claim 1, wherein the cyclic hydrocarbon monomer is at least one member selected from the group consisting of compounds of the following formulae (1) to (8):

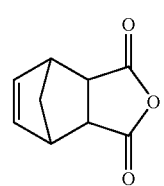

(1)

-continued (2) 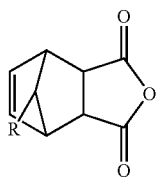

(3) 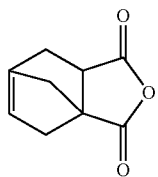

(4) 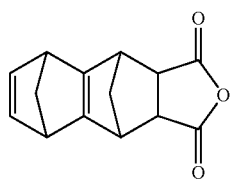

(5) 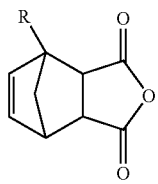

(6) 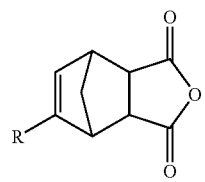

(7) 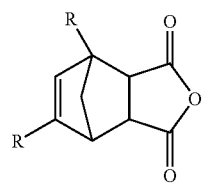

(8) 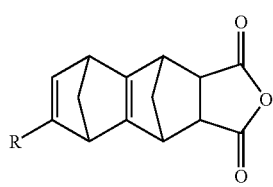

wherein
R is a lower alkyl group having from 1 to 6 carbon atoms, a halogen atom selected from fluorine, chlorine, bromine and iodine, or an alkyl halide having 1 to 6 carbon atoms.

3. The hose according to claim 2, wherein the cyclic hydrocarbon monomer is at least one monomer selected from the group of compounds consisting of the formulae (1), (2), (5), (6), (7) and (8),
wherein
in the formulae (2) and (5) to (8), the substituent R is $CH_3$.

4. The hose according to claim 1,
wherein the cyclic hydrocarbon monomer is 5-norbornene-2,3-dicarboxylic anhydride.

5. The hose according to claim 1, wherein the fluoromonomer which is not tetrafluoroethylene or chlorotrifluoroethylene is at least one member selected from the group consisting of hexafluoropropylene and $CF_2=CFOR^{f1}$ (wherein $R^{f1}$ is a $C_{1-10}$ perfluoroalkyl group which may contain an oxygen atom between carbon atoms).

6. The hose according to claim 1, wherein
the content of the repeating units (a) is from 50 to 99.47 mol %,
the content of the repeating units (b) is from 0.03 to 3 mol % and
the content of the repeating units (c) is from 0.5 to 49.97 mol %.

7. The hose according to claim 1, wherein
the content of the repeating units (a) is from 50 to 98.95 mol %,
the content of the repeating units (b) is from 0.05 to 2 mol % and
the content of the repeating units (c) is from 1 to 49.95 mol %.

8. The hose according to claim 1, wherein
the fluorocopolymer is a tetrafluoroethylene/$CF_2=CFOCF_2CF_2CF_3$/5-norbornene-2,3-dicarboxylic anhydride copolymer, a tetrafluoroethylene/hexafluoropropylene/5-norbornene 2,3-dicarboxylic anhydride copolymer or a tetrafluoroethylene/$CF_2=CFOCF_2CF_2CF_3$/hexafluoropropylene/5-norbornene-2,3-dicarboxylic anhydride copolymer.

9. The hose according to claim 1, wherein the polyamide is polyamide 6, polyamide 66, polyamide 46, polyamide 11, polyamide 12 or a semiaromatic polyamide.

10. The hose according to claim 1, wherein the inner layer comprising the fluorocopolymer and the outer layer comprising the polyamide are produced by co-extrusion.

11. The hose according to claim 1, wherein a fuel permeability coefficient is from 2 to 150 mg/m²·day.

12. A fuel hose comprising the hose as defined in claim 1.

13. The hose according to claim 1, wherein the inner layer further comprises an electrically conductive filler.

14. The hose according to claim 13, wherein the electrically conductive filler is a filler selected from the group consisting of a metal powder, a metal fiber, electrically conductive carbon black, and a metal inorganic compound.

15. The hose according to claim 14, wherein the electrically conductive filler is electrically conductive carbon black.

16. A fuel hose comprising the hose according to claim 15.

17. The hose according to claim 13, wherein an amount of the filler is from 1 to 30 parts by mass based on 100 parts by mass of fluorocopolymer.

18. A fuel hose comprising the hose according to claim 13.

* * * * *